(12) United States Patent
Mai

(10) Patent No.: US 10,563,816 B1
(45) Date of Patent: Feb. 18, 2020

(54) DEVICE FOR QUICK MOUNTING AND DISMOUNTING OF EQUIPMENT ON CEILING

(71) Applicant: Yangjun Mai, Huizhou (CN)

(72) Inventor: Yangjun Mai, Huizhou (CN)

( * ) Notice: Subject to any disclaimer, the term of this patent is extended or adjusted under 35 U.S.C. 154(b) by 0 days.

(21) Appl. No.: 16/112,711

(22) Filed: Aug. 26, 2018

(30) Foreign Application Priority Data

Aug. 8, 2018 (CN) .......................... 2018 1 0893648
Aug. 8, 2018 (CN) ...................... 2018 2 1267497 U

(51) Int. Cl.
| | |
|---|---|
| *F16M 11/00* | (2006.01) |
| *F16M 13/02* | (2006.01) |
| *H04R 1/02* | (2006.01) |
| *F24F 1/0018* | (2019.01) |
| *F21V 21/03* | (2006.01) |
| *F24F 1/0047* | (2019.01) |

(52) U.S. Cl.
CPC ........... *F16M 13/027* (2013.01); *F21V 21/03* (2013.01); *F24F 1/0018* (2013.01); *H04R 1/026* (2013.01); *F24F 1/0047* (2019.02)

(58) Field of Classification Search
CPC .. F04D 29/602; F04D 29/601; H01R 13/6278
See application file for complete search history.

(56) References Cited

U.S. PATENT DOCUMENTS

| | | | | |
|---|---|---|---|---|
| 8,376,777 | B2 * | 2/2013 | Smith | ..................... B60R 25/00 439/140 |
| 10,171,897 | B2 * | 1/2019 | Hart | ........................ H04R 1/025 |
| 2004/0085775 | A1 * | 5/2004 | Bucher | .................... F21V 21/03 362/404 |
| 2018/0058476 | A1 * | 3/2018 | Jones | .................. F04D 25/0693 |

* cited by examiner

*Primary Examiner* — Amy J. Sterling
(74) *Attorney, Agent, or Firm* — Li & Cai Intellectual Property (USA) Office

(57) ABSTRACT

The present invention provides a device for quick mounting and dismounting of equipment on ceiling. The device comprises: a face frame (105), the face frame (105) forming a mounting frame having an inner groove, a fixing plate (104) being positioned under the mounting frame, the mounting frame being mounted with a plurality of cylindrical fixing buckles (101), the fixing buckle penetrating through the mounting frame and the fixing buckle (101) further penetrating a tube, the tube being coupled to a foot buckle (103) via a coupling member, a reset structure (102) being arranged under the coupling member, the reset structure (102) being a telescopic member that is arranged between the coupling member and the mounting frame and positioned in a gap between the foot buckle and the fixing buckle, the mounting frame accommodating a product (2).

4 Claims, 3 Drawing Sheets

US 10,563,816 B1

DEVICE FOR QUICK MOUNTING AND DISMOUNTING OF EQUIPMENT ON CEILING

TECHNICAL FIELD

The present invention relates to a device for quick mounting and dismounting of equipment on ceiling.

BACKGROUND

At present, no reasonable mounting tooling is provided for equipment on ceiling, such as, lights, exhaust fans or ceiling horns in the prior art.

SUMMARY

The present invention is intended to provide a device for quick mounting and dismounting of equipment on ceiling.

The technical solution employed by the present invention to address the technical problem is as follows:

A device for quick mounting and dismounting of equipment on ceiling is provided. The device comprises: a face frame (105), the face frame (105) forming a mounting frame having an inner groove, a fixing plate (104) being positioned under the mounting frame, the mounting frame being mounted with a plurality of cylindrical fixing buckles (101), the fixing buckle penetrating through the mounting frame and the fixing buckle (101) further penetrating a tube, the tube being coupled to a foot buckle (103) via a coupling member, a reset structure (102) being arranged under the coupling member, the reset structure (102) being a telescopic member that is arranged between the coupling member and the mounting frame and positioned in a gap between the foot buckle and the fixing buckle, the mounting frame accommodating a product (2) and being fixed via the fixing plate, the foot buckle (103) mating with a mounting hole of a screw on the product in terms of position, such that quick mounting or dismounting is achieved by turning the foot buckle (103).

Preferably, the equipment on ceiling is a light, an exhaust fan or a ceiling horn.

Preferably, the reset structure (102) comprises a reset spring (1021) that is arranged within the face frame (105).

Preferably, during the mounting, a support plate of the mounting hole pushes the reset structure (102), such that the foot buckle is pushed downwardly under the effect of the reset spring, and the product is mounted on a mounting plate via the foot buckle and a face frame clamping plate.

Preferably, during the dismounting, the foot buckle is pushed by a screwdriver to cause the foot buckle to counterclockwise turn, such that the foot buckle returns to the original position via the reset structure.

With the above technical solution, the above device is capable of quickly mounting and dismounting the equipment on ceiling, and achieving good technical effects.

Other features and advantages of the present invention will be described hereinafter in the specification, which are partially apparent over the specification or acknowledged by practice of the present invention. The objectives and other advantages of the present invention may be practiced and obtained by using the specifically designated structures in the specification, claims and accompanying drawings.

BRIEF DESCRIPTION OF THE DRAWINGS

The present invention is hereinafter described in detail with reference to the accompanying drawings, such that the above advantages of the present invention become more apparent. Among the drawings.

DETAILED DESCRIPTION

Figure 1:
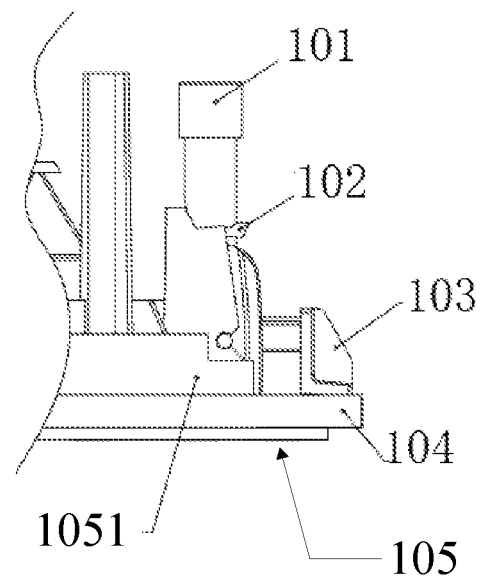
FIG. 1 is a schematic structural view of a device for quick mounting and dismounting of equipment on ceiling according to the present invention.
Figure 2:
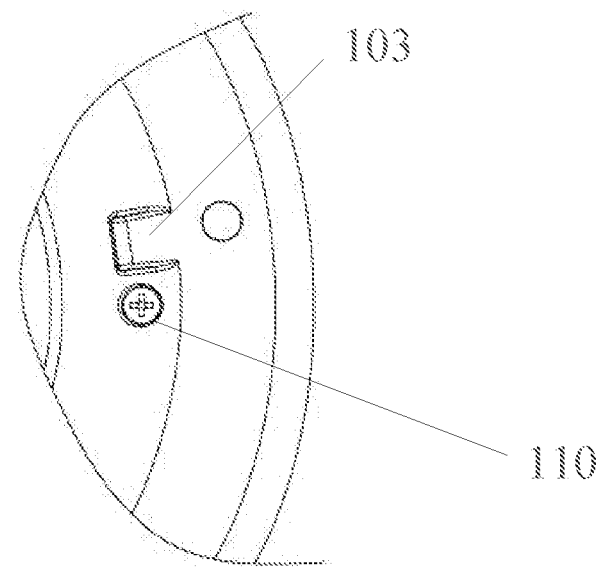
FIG. 2 is a schematic structural view of a device for quick mounting and dismounting of equipment on ceiling according to the present invention.
Figure 3:
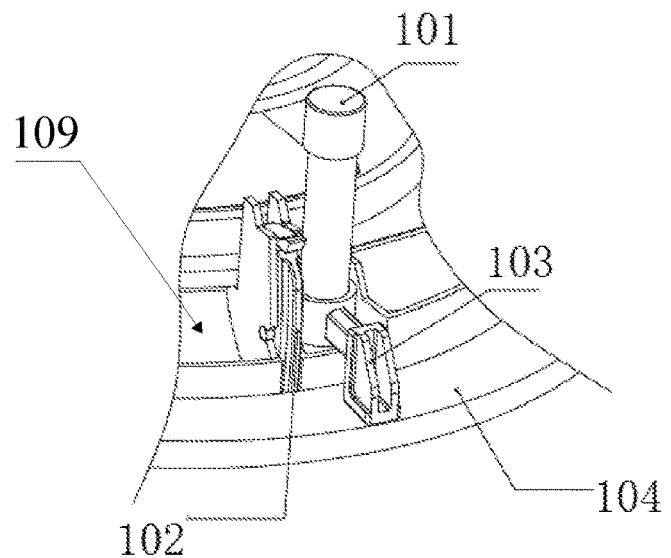
FIG. 3 is a schematic structural view of a device for quick mounting and dismounting of equipment on ceiling according to the present invention.
Figure 4:
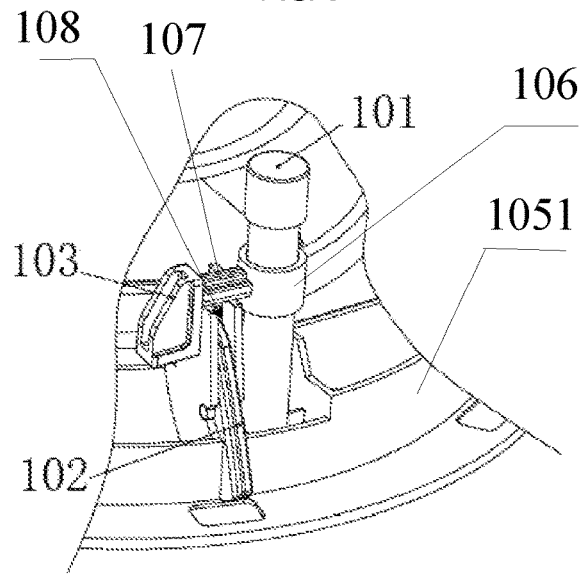
FIG. 4 is a schematic structural view of a device for quick mounting and dismounting of equipment on ceiling according to the present invention.
Figure 5:
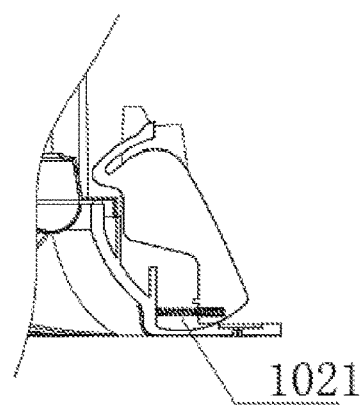
FIG. 5 is a schematic structural view of a device for quick mounting and dismounting of equipment on ceiling according to the present invention.
Figure 6:
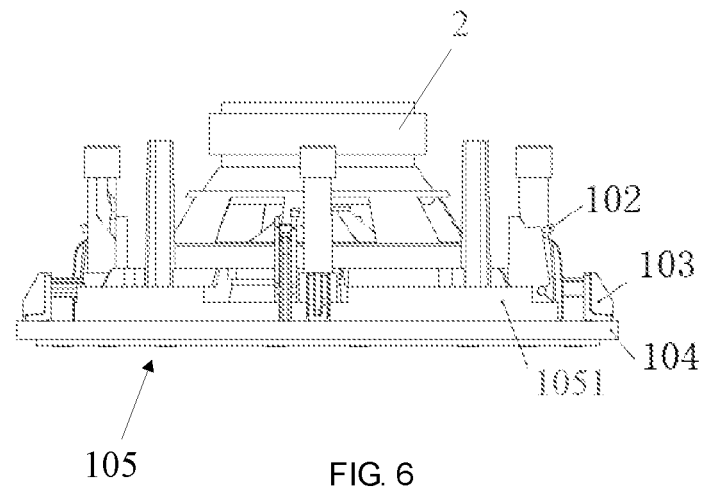
FIG. 6 is a schematic mounting view of the device for quick mounting and dismounting of equipment on ceiling according to the present invention.
Figure 7:
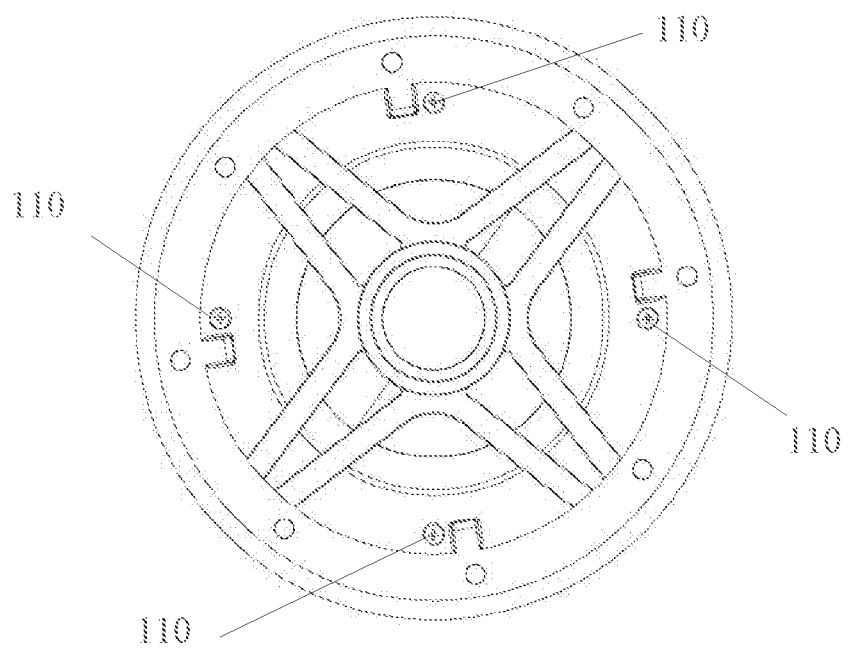
FIG. 7 is a schematic bottom view of the device for quick mounting and dismounting of equipment on ceiling according to the present invention.

Practice of the present invention is described in detail with reference to drawings and specific embodiments, such that the practice of addressing the technical problem using the technical means according to the present invention and achieving the technical effects may be better understood and conducted. It should be noted that in cases of no conflict, the embodiments and features in the embodiments of the present invention may be combined together, and the formed technical solutions are all within the protection scope of the present invention.

As illustrated in the drawings, a device for quick mounting and dismounting of equipment on ceiling is provided. The device comprises: a face frame (105), the face frame (105) forming a mounting frame (1051) having an inner groove (109), a fixing plate (104) being positioned under the mounting frame (1051), the mounting frame (1051) being mounted with a plurality of cylindrical fixing buckles (101), the fixing buckle penetrating through the mounting frame (1051) and the fixing buckle (101) further penetrating a tube (106), the tube (106) being coupled to a foot buckle (103) via a coupling member (107), a reset structure (102) being arranged under the coupling member (107), the reset structure (102) being a telescopic member that is arranged between the coupling member (107) and the mounting frame (1051) and positioned in a gap (108) between the foot buckle and the fixing buckle, the mounting frame (1051) accommodating a product (2) and being fixed via the fixing plate, the foot buckle (103) mating with a mounting hole of a screw on the product in terms of position, such that quick mounting or dismounting is achieved by turning the foot buckle (103).

In the device, the equipment on ceiling is a light, an exhaust fan or a ceiling horn.

In addition, the reset structure (102) comprises a reset spring (1021) that is arranged within the face frame (105).

According to the present invention, according to the dynamic and mechanical principles, the unique quick mounting and dismounting structure is designed. As long as the mounting hole is reserved and the product is placed on the support plate of the mounting hole, quick mounting is implemented by pushing the foot buckle. For dismounting, the product may be quickly dismounted also by pushing and turning the foot buckle, which is labor saving, and quick and convenient.

Specifically, during the mounting, a support plate of the mounting hole pushes the reset structure, such that the foot buckle is pushed downwardly under the effect of the reset spring, and the product is mounted on a mounting plate via the foot buckle and a face frame clamping plate; and during the dismounting, the foot buckle is pushed by a screwdriver to cause the foot buckle to counterclockwise turn, such that the foot buckle returns to the original position via the reset structure. During the dismounting, the product is supported by the hand to prevent drop-down.

It should be finally noted that described above are exemplary embodiments of the present invention, which are not intended to limit the protection scope of the present invention. Although the present invention is described in detail with reference to the above embodiments, a person skilled in the art would still make modifications to the specific embodiments and the technical solutions disclosed therein, or would still make equivalent replacements to a part of the technical features therein. Any modification, equivalent replacement, or improvement made without departing from the spirit and principle of the present invention should fall within the protection scope of the present invention.

The invention claimed is:

1. A device for quick mounting and dismounting of equipment on ceiling, comprising:
    a face frame (105), the face frame (105) forming a mounting frame (1051) having an inner groove (109), wherein a fixing plate (104) of the ceiling is positioned under the mounting frame (1051), wherein the mounting frame (1051) is mounted with a plurality of cylindrical fixing buckles (101), wherein the fixing buckle penetrates through the mounting frame (1051) and the fixing buckle (101) further penetrates a tube (106), wherein the tube is coupled to a foot buckle (103) via a coupling member (107); and
    a reset structure (102) being arranged under the coupling member (107), wherein the reset structure (102) is arranged between the coupling member (107) and the mounting frame (1051) and positioned in a gap (108) between the foot buckle (103) and the fixing buckle (101), wherein the reset structure (102) comprises a reset spring (1021) that is arranged within the face frame (105),
    wherein when the mounting frame (1051) accommodates a product (2) and the product is fixed to the mounting frame (1051) via the fixing plate (104), the foot buckle (103) mating with a mounting hole of a screw on the product in terms of position, such that quick mounting or dismounting is achieved by turning the foot buckle (103).

2. The device for quick mounting and dismounting of equipment on ceiling according to claim 1, wherein the equipment on ceiling is a light, an exhaust fan or a ceiling horn.

3. The device for quick mounting and dismounting of equipment on ceiling according to claim 1, wherein during the mounting, a support plate of the mounting hole pushes the reset structure (102), such that the foot buckle is pushed downwardly under the effect of the reset spring, and the product is mounted on a mounting plate via the foot buckle and a face frame clamping plate.

4. The device for quick mounting and dismounting of equipment on ceiling according to claim 1, wherein during the dismounting, the foot buckle is pushed by a screwdriver to cause the foot buckle to counterclockwise turn, such that the foot buckle returns to the original position via the reset structure.

* * * * *